March 8, 1927.

A. TAURMAN 1,620,172

RAIL CLAMPING APPARATUS

Filed April 28, 1926    3 Sheets-Sheet 3

INVENTOR

BY

ATTORNEY

Patented Mar. 8, 1927.

1,620,172

UNITED STATES PATENT OFFICE.

ALPHONSO TAURMAN, OF BIRMINGHAM, ALABAMA, ASSIGNOR TO METAL & THERMIT CORPORATION, OF CARTERET, NEW JERSEY, A CORPORATION OF NEW JERSEY.

RAIL-CLAMPING APPARATUS.

Application filed April 28, 1926. Serial No. 105,122.

The invention relates to apparatus for clamping rails of various types for welding the ends thereof together, and, to this end, comprises a bench-like support provided with longitudinally spaced standards having substantially vertical and horizontal aligning faces to engage and align the tread and gauge faces of the rails, means operating from below the support to lift the rails into engagement with the standards, means for forcing the rails laterally against the standards, and means, preferably in the form of a clamp extending longitudinally of the support, for exerting pressure longitudinally of the rails to force together the ends to be welded.

The invention is illustrated in the accompanying drawings, in which:—

Figure 1:
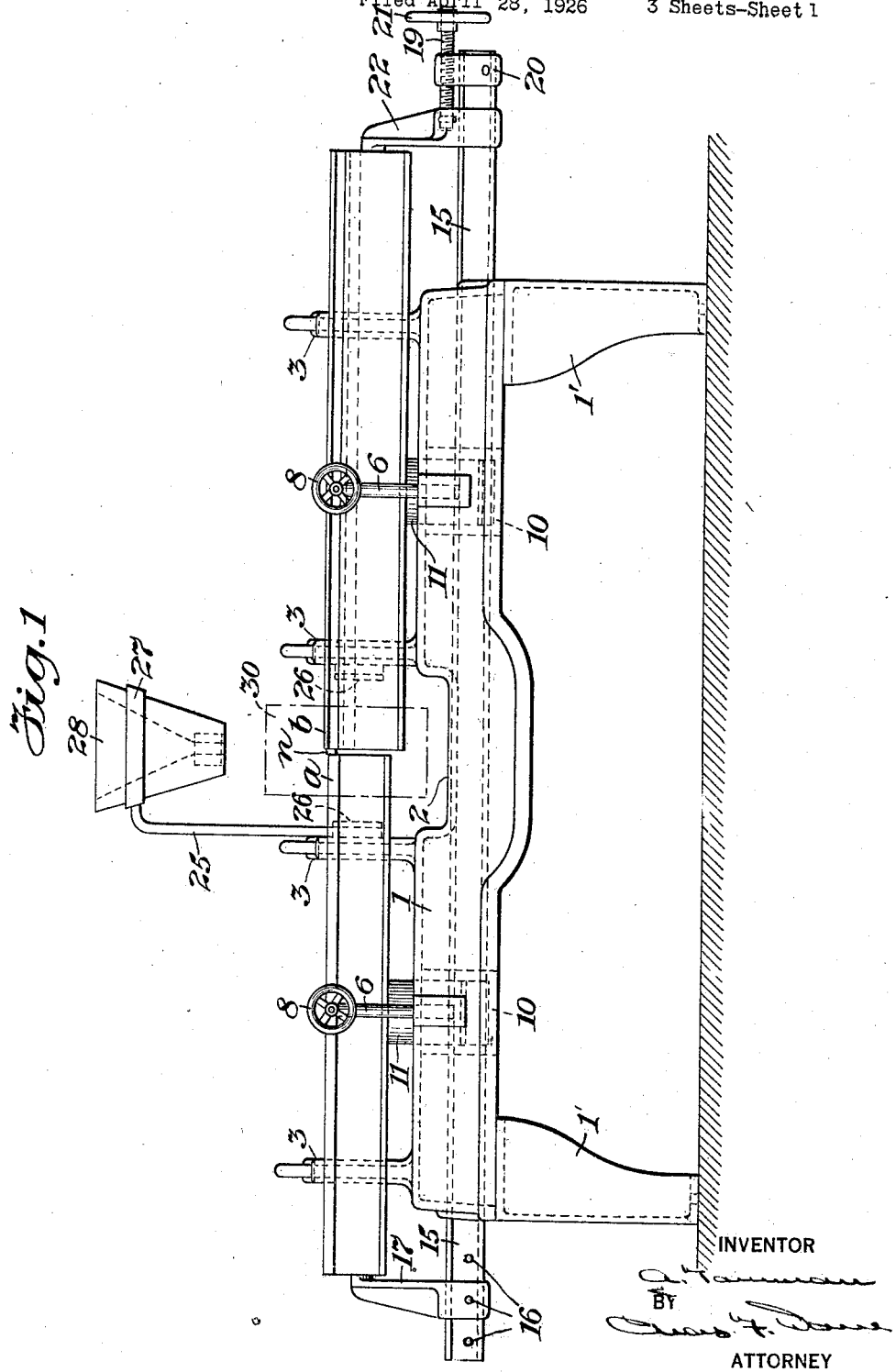
Figure 2:
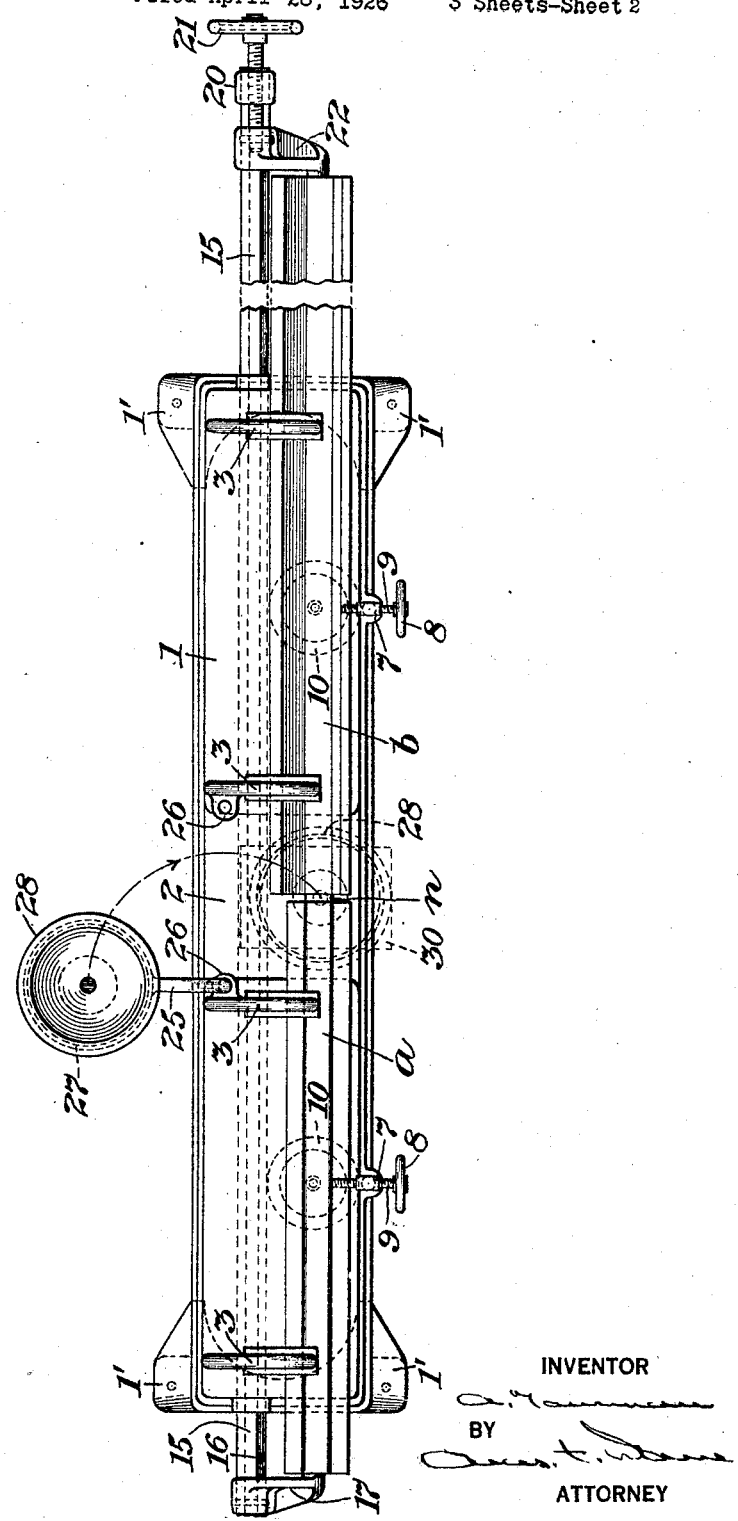

Fig. 1 is a side elevation of the apparatus having two rail sections of different types clamped therein;

Fig. 2 a plan view of the same; and

Figure 3:
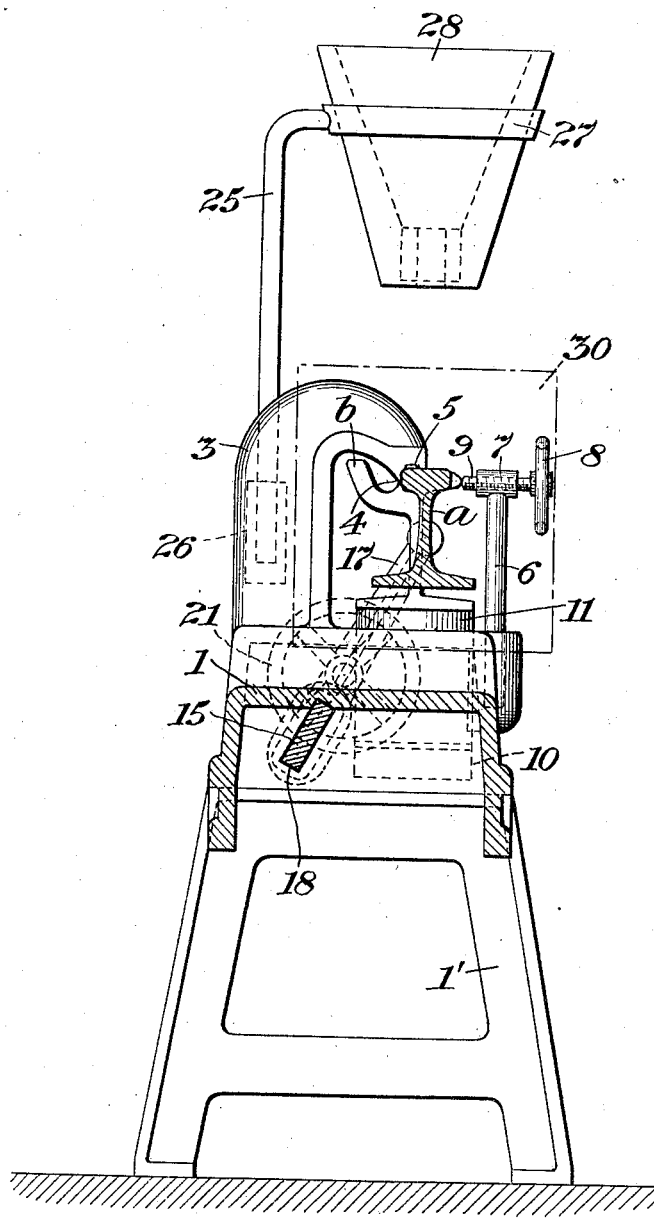

Fig. 3 a sectional end elevation.

In practice, rails are generally welded together in place in the track where the rails are aligned on ties or other foundations, the rail ends being brought into proper relation with each other with the tread and gauge faces of the respective rails lying in the same planes, the necessary adjustment to effect this operation being made by means of shims or wedges driven between the bases of the rails and the ties or foundation members. It is frequently desirable, however, to weld rail sections together before they are laid in the track, as, for instance, in a shop or other place where they must be welded while occupying a temporary support or foundation. This is usually the case in the welding or making of compromise joints between rails of different cross sections, as, for example, an ordinary T rail and a grooved rail. Such an operation, as generally carried out, requires the laying of temporary ties or similar foundations and the bolting or clamping of the rail sections to hold them in proper alignment as to tread and gauge faces, in practically the same manner as would be required if the rails were in situ in the track. These laborious and time consuming operations are altogether out of proportion to the time and effort required to effect the weld between the rail ends, and, to add to the difficulties, effective means for forcing the rail ends together, so that a firm contact may be assured either between the ends or between said ends and the interposed filler piece, are not generally available. All of these difficulties, however, are overcome by the present invention, which is designed to facilitate the welding together of rail sections and similar members of practically all types of rails with the assurance that the tread and gauge surfaces of the rails shall be in proper alignment and the necessary longitudinal pressure exerted on the rail sections to effect a perfect joint, when the welding material, such as alumino-thermic steel, is cast about the meeting ends of the rails.

Referring to the drawings, 1 indicates the bed of a bench-like frame or support, preferably provided with end legs or supports 1', 1', the middle section of the table or frame preferably being depressed, as at 2, to provide a space for the reception of the mold, represented at 30, which is clamped about the rail ends $a$ and $b$, the rail $a$ as here shown being a T rail and the rail $b$ a grooved rail. Extending vertically from one side of the bed 1, and preferably formed integrally therewith, are a series of standards 3, in longitudinally spaced relation, each having an overhanging top section provided with a substantially vertical face 4 adapted to engage the gauge face of a rail, and a substantially horizontal face 5 to engage the top surface or tread of the rail, the corresponding faces 4 and 5 of all of the standards being in longitudinal alignment.

Secured in sockets on the opposite side of the bed 1 are bars or rods 6, to the upper ends of which are secured threaded bushings 7 to receive clamping screws 9 provided with hand wheels 8, the screws, when set up, engaging the lateral faces of the heads of the rails and forcing the gauge surfaces of the rails in engagement with the corresponding surfaces 4 of the standards 3.

Special means are provided for lifting the rails into engagement with the tread aligning surfaces of the standards 3, which means are preferably in the form of fluid pressure jacks comprising cylinders 10 mounted in the bed or frame 1 and cooperating plungers or rams 11 which extend upwardly through the top surface of the frame to engage the under side of the rails, as illustrated in Fig. 1. Suitable means, not shown, are provided for supplying the jacks with a suitable fluid pressure medium to effect the operation of the plungers. Obviously, any other suitable form of jack or lifting device for raising the rails may be substituted for the particular type of fluid pressure jack, as shown.

In welding together the ends of rails, it is absolutely essential that the rail sections be held rigidly against longitudinal movement and the ends to be welded forced into intimate contact with each other or into engagement with an interposed filler piece or insert and, to effect this object, the apparatus is provided with a special form of clamp adapted to engage the ends of the respective rail sections after said sections have been properly positioned otherwise, said clamp comprising a bar 15 extending longitudinally of the bed of the apparatus and mounted in slots 18 in the ends of the bed, said bar having at one end a series of spaced bolt holes 16 by means of which a jaw 17 may be adjustably secured to the bar by means of a bolt passing through registering openings in the jaw and bar, as will be understood by reference to Fig. 1. The opposite end of the bar has secured thereto a yoke-like member 20, provided with a threaded bushing in which is engaged a set screw 19 provided with a hand wheel 21, the inner end of the set screw having a swivelled engagement with a sliding jaw 22 mounted on the bar 15. As indicated, the slots 18 are formed with an angle to the vertical axis of the bed 1 and slightly offset, so that the bar and the opposing jaws 17 and 22 are inclined with respect to said axis, so as to allow ample room for the installation of the lifting jacks. The upper ends of the jaws engage the ends of the respective rails, and, by properly adjusting the fixed jaw 17 and then setting up the adjustable jaw 22 by means of the screw 19, the rail sections may be forced together end to end with any desired pressure and clamped rigidly in longitudinal alignment, thus assuring the continuity of the running surface after the weld is made. This means for effecting endwise clamping of the rails has an especial advantage if a loose insert, such as indicated at n, is placed between the rail heads, because it avoids the difficulty frequently encountered otherwise, of the dropping of the insert during the welding operation.

The mold frame 30, illustrated in dotted lines, may be readily assembled about the abutting ends of the rails, after the rail sections have been properly adjusted, and clamped in position, as indicated in the drawings, and, in order to supply the alumino-thermic steel or other highly heated molten metal to effect the welded joint, the device is provided, near its middle section, with a socket 26 in which is rotatably mounted a standard 25 having a ring-shaped support 27 at its top, in which the crucible 28 is mounted, the standard being so disposed that, when it is swung around over the top of the bed 1, the discharge outlet in the bottom of the crucible will be in alignment with the pouring gate in the top of the mold 30.

From the foregoing description, it will be apparent that rail sections of either identical or dissimilar cross sections may be readily applied and clamped in position in the machine for the subsequent welding operation, with the assurance that the tread and gauge faces of the rail sections will be clamped in accurate alignment, and the adjacent ends of the rails sections forced toward each other and held in rigidly clamped relation, so that no relative movement of the rail sections, during the welding operation, is possible.

What I claim is:

1. Apparatus for clamping rails of various types for welding operations, comprising a supporting frame, spaced standards on said frame having substantially vertical and horizontal aligning faces to engage and align the tread and gauge faces of the rails, means carried by the frame to lift the rails into engagement with the standards, means for forcing the rails laterally against the standards, and means for exerting pressure longitudinally of the rails.

2. Apparatus for clamping rails of various types for welding operations, comprising a supporting frame, spaced standards on said frame having substantially vertical and horizontal aligning faces to engage and align the tread and gauge faces of the rails, jacks operating through the frame to lift the rails into engagement with the standards, means for forcing the rails laterally against the standards, and means for exerting pressure longitudinally of the rails.

3. Apparatus for clamping rails of various types for welding operations, comprising a supporting frame, spaced standards on said frame having substantially vertical and horizontal aligning faces to engage and align the tread and gauge faces of the rails, means carried by the frame to lift the rails into engagement with the standards, means for forcing the rails laterally against the standards, and adjustable means for exerting pressure longitudinally of the rails.

4. Apparatus for clamping rails of various types for welding operations, comprising a supporting frame having a depressed intermediate section to accommodate a mold box, spaced standards on said frame having substantially vertical and horizontal aligning faces to engage and align the tread and gauge faces of the rails, means carried by the frame to lift the rails into engagement with the standards, means for forcing the rails laterally against the standards, and means for exerting pressure longitudinally of the rails.

5. Apparatus for clamping rails of various types for welding operations, comprising a supporting frame, spaced standards having arms overhanging the top of the frame, said arms having aligning faces to engage and align the tread and gauge faces of the rails, jacks operating through the frame to lift the rails into engagement with the standards, means for forcing the rails laterally against the standards, and means for exerting pressure longitudinally of the rails.

6. Apparatus for clamping rails of various types for welding operations, comprising a supporting frame, spaced standards on said frame having substantially vertical and horizontal aligning faces to engage and align the tread and gauge faces of the rails, fluid pressure-actuated jacks operating through the frame to lift the rails into engagement with the standards, means for forcing the rails laterally against the standards, and means for exerting pressure longitudinally of the rails.

7. Apparatus for clamping rails of various types for welding operations, comprising a supporting frame, spaced standards on said frame having substantially vertical and horizontal aligning faces to engage and align the tread and gauge faces of the rails, jacks operating through the frame to lift the rails into engagement with the standards, vertical arms on the frame, set screws carried by said arms for forcing the rails laterally against the standards, and means for exerting pressure longitudinally of the rails.

8. Apparatus for clamping rails of various types for welding operations, comprising a supporting frame, spaced standards on said frame having substantially vertical and horizontal aligning faces to engage and align the tread and gauge faces of the rails, jacks operating through the frame to lift the rails into engagement with the standards, vertical arms on the frame, set screws carried by said arms for forcing the rails laterally against the standards, a bar supported in said frame below the top thereof, a jaw adjustably fixed on one end of said bar, a jaw slidable on the other end of the bar, and a set screw on the bar for effecting fine adjustments of said slidable jaw, said jaws engaging the ends of the rails to exert pressure longitudinally of the latter.

In testimony whereof I affix my signature.

ALPHONSO TAURMAN.